UNITED STATES PATENT OFFICE.

RAPHAEL JOSIA, OF FLORENCE, ITALY, ASSIGNOR TO LA SOCIÉTÉ ANONYME DE CERTALDO, OF PARIS, FRANCE.

ARTIFICIAL STONE, MARBLE, &c.

SPECIFICATION forming part of Letters Patent No. 267,217, dated November 7, 1882.

Application filed March 2, 1882. (Specimens.) Patented in Belgium July 26, 1881, No. 55,273; in England July 28, 1881, No. 3,303; in Luxemburg November 25, 1881, No. 172; in France December 27, 1881, No. 146,555; in Austria April 7, 1882, No. 4,724, and in Spain May 3, 1882, No. 2,613.

*To all whom it may concern:*

Be it known that I, RAPHAEL JOSIA, of Florence, in the Kingdom of Italy, have invented Improvements in the Manufacture of Artificial Stone and Marble, &c., of which the following is a specification.

This invention relates, in general terms, to a method or process of working gypsum and other sulphates of lime capable of like treatment into manufactured articles for use or ornament, and to the manufacture of such articles from such material, as well as to the products themselves. The articles produced have many of the desirable qualities of marble or of the finer kinds of artificial stone, such as hardness, capability of resisting climatic or atmospheric change, a high polish, an ornamental appearance, &c. Also, imitations may be made of precious stones, porcelain, china, ivory, celluloid, &c.

As regards the material from which the articles are to be made under the present invention, I do not limit myself to the chemically pure sulphate of lime, as it is seldom found in that state, but usually contains various impurities, so that I include herein all materials having sulphate of lime as their base and adapted to be hardened, as presently to be described; and for the purposes of this description I will use the term "gypsum" as inclusive of all such materials. This material, as is well known, comes from the earth in a comparatively soft condition, somewhat porous, is comparatively soluble, contains usually a small but sometimes a considerable percentage of impurities, which are found more especially along the veins, striations, or interstices of the gypsum, and more commonly it is white or of a light color.

Heretofore gypsum has commonly been utilized in the arts or for manufacturing purposes by a process of calcination and grinding, after which it is mixed with water, so as to effect a new solidification. It has also been common to carve or cut ornamental articles from firmer and finer qualities of sulphate of lime, as, say, alabaster; but, so far as I am aware, no process has been discovered nor means invented of date prior to my invention by which the articles so cut or carved can be hardened to that extent or degree that they will withstand rough usage or even permanent out-of-door exposure. In my present invention I employ the gypsum as it comes from the mine, or in its native condition, by which I mean without pulverization. This material I cut or carve or similarly work by the use of any tools or machines adapted to the working of a soft stone like this, so as to produce the article or shape desired, whether it be for use or ornament. Thus far nothing is required except taste in designing and skill in executing.

My invention, in its chief elements of novelty, is directed to the simultaneous attainment (in most cases) of two ends: first, to the hardening or indurating of the material or articles thus cut, fashioned, or brought to form, so as to fit them for exposure to climatic changes, rain, frost, &c., also so as to render them capable of withstanding hard wear or rough usage, as when in the form of floor-tile; and, second, to the coloring or tinting of such articles and fixing the colors or tints, so as to secure an ornamental appearance. In fact, I can secure in the articles made substantially the hardness, general appearance, polish, and durability of marble, and a variety of colors largely in excess of those found in marble, and colors, too, equally as pleasant to the eye, and many of them more so. The product thus made, considered only as product, I have termed "certaldite."

The first step which should be described is one which is employed to render the material anhydrous, or practically so, over the surface and to the desired depth, and this I do by a baking or drying operation, which may be applied to the material while in a rough, uncut, or unfinished condition, or when in the form of plates or slabs, or after the articles to be made are completely cut, fashioned, or shaped, or only partially so. Preferably the articles to be made or treated are cut, fashioned, or shaped before the baking or drying is done, and thus better results can be more uniformly and easily attained. Any suitable drying or baking apparatus may be employed, many such being known in kindred branches of the arts; but it should be of such construction and operation that the articles or materials shall not be brought into direct contact with the fire. The duration of this part of the process—which for convenience may be termed a "dehydrating" operation—and the degree of temperature to be employed will vary according to the nature of the grain or the porosity or composition of the gypsum and the size or dimensions of the article under treatment. The coarser the grain or the greater the porosity, or the smaller or thinner the article under treatment, the more rapidly can it be dehydrated, and vice versa. With the gypsum which I have chiefly used—such as is obtained at Certaldo, in Italy—when in the form of pieces or of articles of moderate dimensions, cut or worked to shape, an exposure to a temperature of from about 120° to 150° centigrade for a period of about twelve hours will usually be found sufficient; and the better way of applying this heat is by a gradually-increasing and then a gradually-decreasing temperature. When treating pieces or articles exceeding about one or one and a half inch in thickness the operation will require more time, and may be known to be completed when a fracture of the block presents a uniform white color throughout, though the dehydrating operation may be arrested sooner, if so preferred. When the process of dehydration is complete—by which I mean when the greater part of the water has been driven off, either by evaporation or by chemical action—the block, piece, or article is left to cool, say, for one, two, or more hours, till it comes down to or nearly to atmospheric temperature, or till it will be free from danger of fracture or other injury on being immersed in a bath, and it is then ready for the next step in the process, which is one by which it is hardened or indurated, with or without the use of special materials for coloring or tinting or changing the color or tint of the same.

For the purpose of hardening the gypsum I dip or immerse the block, piece, or article in a liquid bath, or otherwise treat it with a liquid, which in its preparation may be considerably varied, but which, in general terms, may be described as containing in solution usually a salt and an acid. Thus for most purposes I employ alum—which is a double salt—and oxalic acid, and a suitable mixture may be made by dissolving about four pounds of alum and two pounds of oxalic acid in twenty gallons of water; but these proportions may be varied somewhat, as may all others herein noted, as well as degrees of temperature, duration of time, &c. Exact limitations in these respects are not of the essence of the present invention; but the variations should not be excessive. The block, piece, or article of gypsum is to be dipped in this bath, as presently to be explained.

While I do not limit myself as regards any particular theory of operation, chemically or otherwise, which is involved in the working of my invention, I believe, with my present knowledge, that the chief work or effect of the salt is by taking the place of or replacing the molecules of water driven off or eliminated in the dehydrating operation, so as to substitute a water containing a salt for the molecules of water acted on in the dehydrating part of the process, as a result of which the salt so added tends to render the article or material more compact, harder, and less soluble, and probably has also a like effect by chemical action and physical on the impurities present; and, still further, as nearly all qualities of gypsum produced from the earth contain a greater or less percentage of impurities which may be acted upon by oxalic or other acids, and be thereby hardened or set so as to become less soluble than before, I believe the oxalic acid so acts on such impurities and has a like effect as regards lessening solubility on the sulphate itself; but, whatever may be the theory of operation, I have found that the conjoint and simultaneous action of a salt and an acid dissolved in a liquid on gypsum in the manner substantially as herein described is such as to impart to it a degree of hardness, density, lack of solubility, &c., such as to render it an excellent substitute for marble or for the finer qualities of artificial stone, &c., for all or pretty much all purposes of use or ornamentation to which such material has been or can be applied.

The bath prepared as above directed is more particularly designed for use in treating the lighter-colored or colorless gypsums with reference to getting a product white or of a light color.

The next step in the present invention relates to the coloring or tinting of the material so treated, which coloring or tinting is done simultaneously with the hardening, and preferably in the same bath. When the material is of that quality or character that the ingredients of the hardening-bath do not materially affect the color, or do not produce the proper or desired color or tint, I incorporate into the bath suitable mineral, vegetable, or aniline or other coloring-matter, with reference to securing in the product the particular color, shade, or tint desired. Thus for a pink-bath, or a bath to give a pink tint or color, about an ounce of pink aniline may be added to the bath above described. For a light-brown bath about two pounds of extract of the husk of the walnut may be added.

The skilled workman having knowledge of the qualities of the material under treatment and of the effects thereon of the hardening material can readily ascertain by the use of test pieces how and in what amount he is to introduce dyeing material, so as to get in the product the color, shade, or tint desired, the proportion of the ingredients composing the bath being slightly altered according to the kind or quality or nature of the gypsum and the shade of color sought for; but instead of using a special coloring-matter, as thus described, the desired coloring effect may be produced with many qualities of gypsum by the use in the preparation of the hardening-bath of such acids or salts, or both, as will give the hardening effect desired, and will also at the same time change the color or tint or impart a color or tint, as desired; and while in this respect I do not limit myself to any particular theory of operation, I believe it to be true that some of the known salts or acids suitable for use in hardening also may act as a dye; and, still further, that as regards certain impurities found in gypsum, the acid or salt which may be employed in the bath may act chemically or physically not only to harden such impurities, as above described, but also to change or modify their color, and, as I believe, by virtue of this latter fact I am able to get variegated colors or tints irregular in pattern or design, such variegations and irregularities, whether produced in streaks or in spots or blotches, resulting, in part at least, from the irregular distribution of such impurities through or in the block, piece, or article of gypsum under treatment. Thus, for example, to make a sky-blue bath I have used water, twenty-two gallons; alum, ten pounds; oxalic acid, two pounds, and yellow prussiate of potash, one ounce. For some purposes or with some qualities of gypsum, and for the production of some colors, I have found it advantageous to employ in the bath both a vegetable coloring ingredient and a salt having coloring properties—as, for example, I have used for a black-bath, water, by weight, two hundred parts; Campeachy-wood, by weight, three parts; gall-nuts, by weight, six parts; logwood, by weight, one-half part; sulphate of iron, by weight, three parts; sulphate of copper, by weight, one-half part. In this composition the sulphate of iron operates to harden the gypsum and render it insoluble, and it aids in coloring as also in the hardening of the carbonates of the impurities by forming with one or more of the other ingredients the tannate of iron. If the gypsum contains a considerable percentage of carbonates, it may be advantageous to add a small percentage of oxalic acid. By lessening the proportions of coloring-matters any desired variety of gray may be obtained. Also in some cases an acid or salt may be added as a mordant specially for the purpose of fixing the color.

In working this invention the skilled workman must have, approximately at least, (unless he chooses to work experimentally,) a knowledge of the kind or quality of gypsum to be treated, inclusive of its impurities, if any, or of its action under treatment, and such knowledge may be acquired by means known to the chemist, or experimentally by the use of test pieces, or otherwise, as he may prefer. The skilled workman will also exercise his skill and knowledge in the selection of materials, as well as in compounding them, without limiting himself to those above named. Thus, instead of alum, or along with alum, any suitable salt may be employed—as, for example, salts of magnesia, carbonate of potash, soda, sulphate of iron, sulphate of copper, bichromate of potash, potash, cyanide of potassium, and, in fact and generally, the known acetates, oxalates, sulphates, nitrates, and carbonates, or their chemical equivalents, such as are capable of imparting hardness to or indurating gypsum, and will not decompose it; and, as regards the acid element when used, (as it may in some cases be omitted,) any suitable acid may be employed, such as nitric, sulphuric, or acetic, or their chemical equivalents. It will be found that the substances thus compounded place themselves in combination with the gypsum either by filling the spaces which before dehydration were occupied by the molecules of water or by becoming chemically blended with the elements of the material under treatment; and to this end the ingredients to be used in the preparation of the bath are to be selected somewhat according to the nature of the reactions which take place when the said substances are brought into contact with gypsum, their effect upon the stability and fixing of the colors, when coloring-matters are employed, being also taken into consideration; and, as already stated in substance, the desired color may be imparted either by the reaction of two or more of the substances hereinbefore enumerated or by the addition of suitable organic or mineral coloring-matter. By the treatment thus described the desired degree of hardness and the desired color (when colored certaldite is required) are imparted to the materials under treatment to convert them into stone, artificial marble, &c. The said materials may be submitted to the action of the hereinbefore-described bath either in a rough or unwrought condition or after they have been wrought or formed, or partially so, into the shape of the finished article; but it is not an essential that only a single bath be used, as varied effects may be attained by the use of separate baths prepared on the principles above stated, and the materials be dipped first in one and then in the other; also, where a specific coloring-matter is employed the article or material may be first dipped in the coloring solution and then in a hardening or hardening and coloring solution. The length of time during which the material should be kept under this hardening treatment will depend somewhat on the strength of the ingredients composing the bath, the character and rapidity of the chemical reactions involved, the porosity and nature or physical and chemical condition of the material, &c.; but usually about twelve hours (more or less) will suffice, though I prefer repeated dippings—two, three, or more, say two or three seconds at first, and increasing gradually to one, two, three, or more minutes, more or less, with drying intervals of like increasing length between dippings—for half an hour or so, after which the article may remain in the bath for twelve hours or so.

In order that my description may be ample, I will describe the operation by which I have been making white certaldite: The slabs, cut or sawed to a thickness of about one inch, are heated in a stove or oven for a period of from twelve to eighteen hours at a temperature running from about 100° to 150° centigrade. In treating thicker blocks or slabs a somewhat higher temperature will be required. This operation of dehydration or driving off the water is of great importance, and care must be taken not to allow the temperature to rise to an excessive extent, as this would render the materials liable to crack and become injured by the subsequent treatment in the bath. In other words, the temperature must not be such as to produce decrepitation or disintegration. The completing of the dehydrating process throughout the whole of the materials under treatment may be ascertained by examining the grain of the fracture by means of a suitable sample or test piece. After the drying operation has been carried to the desired extent, the slabs, blocks, or articles are allowed to cool for a few hours, and they are then immersed in a bath, composed, for example, of about four pounds of alum and two pounds of oxalic acid dissolved in about twenty-two gallons of water. The said slabs, blocks, or articles are allowed to remain in this bath for about two or three seconds, after which they are taken out and allowed to dry for a few seconds, being then again plunged into the bath for about six or eight seconds and again allowed to dry. This process of alternate immersing and drying is carried on, with a lengthening of the intervals between and the times of the dipping, till at the expiration of about half an hour or three-quarters, the blocks, slabs, or articles are left immersed in the liquid for about twelve hours. Then being removed, they are dried by being exposed to the sun or to a temperature of from 30° to 40° centigrade for about one or two hours, or to ordinary atmospheric temperature for two or three days. The article, if cut to shape or when cut to shape, is ready for polishing. When in slab or plate form, I have done this by employing cast-iron plates with sand and water in the first place, and afterward with water alone, though other suitable means (such being well known in the art) may be substituted. Then the articles are treated with oil (preferably olive-oil) applied over the surface one, two, or three times, and then left to dry. If a high polish is desired, the surface to be polished is then rubbed with any suitable polishing material, such as a rubber of lead foil and emery, powder and water, or bone-dust applied by a woolen cloth, preferably commencing with the one and ending with the other. In this way a fine polish can be given to the articles or materials. The entire process can then be considered as terminated; but if a greater degree of hardness or special combinations of colors are desired the operations of dehydration and subsequent bathing, in the manner described, may be repeated one or more times.

No separate claim is made herein for the special compounds or mixtures of ingredients employed in the preparation of the baths hereinbefore described or referred to, and such subject-matter of invention is reserved for one or more separate applications to be filed in due time.

I am aware that it has been proposed, in a general way, to harden gypsum by operations which involve drying and the use of alkaline solutions; but I am not aware that what has been so proposed has ever been reduced to practice in any form prior to the date of my invention, or that it has otherwise been made or was capable of being made of any practical or beneficial value to anybody or for any useful purpose, except by further invention; nor am I aware of any prior publication or patent which sets forth or describes any process or method of hardening gypsum by the use of a solution of chemical salt (either with or without acids) in such terms that by following the same, without further invention or without changes suggested by and as a result of experiment, any product could be made of practical value in the arts, either for the purposes of use or ornamentation. And, by way of a more accurate statement of what I now believe to be the best way of working the present invention, I may add that for such purpose the drying or dehydrating temperature should be such (exactly or approximately as stated) as not merely to drive off water physically combined with the gypsum, but also all or a considerable percentage of the chemically-combined water, to the end that the molecules of water so expelled may be replaced by a chemical salt insoluble or practically so. Also, the time during which the drying or dehydrating action is carried on should be such, as above stated, that its action shall be more than skin deep, or, in other words, so that the entire body or a considerable portion of it, if it be large, shall be dehydrated.

It may also be stated that in order to secure the replacement of the expelled water by a chemical salt to or approximately to the full depth to which the dehydrating operation has been carried, as above stated, the solution containing the salt had best be only moderately strong, or about in the proportions above stated, since the tendency of a fully-saturated solution is to deposit rapidly in the outer interstices of the gypsum, so preventing the proper action to the full or desired depth, and as this work of depositing thus goes on somewhat slowly, the article or articles should be subjected to the action of the solution for about the time stated and at about atmospheric temperature.

When, as is often the case, the impurities present in the gypsum consist partly or wholly of carbonate of lime, the use of acid, as described, is especially desirable, since apparently the carbon passes off as carbonic-acid gas, and (oxalic acid being used) the oxalate of lime is formed, which, being insoluble, further aids in securing a product having the desired qualities; and other acids will in like manner form the corresponding salts. Also, the gypsum sometimes contains a small percentage of hydrocarbons, and these, when present, are oxidized by the oxalic acid and darkened in color.

I claim herein as my invention—

1. The method of preparing gypsum for use in the arts by first dehydrating it, without pulverization, substantially as described, and then treating it with a liquid salt, substantially as described, and either with or without a coloring-matter, substantially as described.

2. The method of preparing gypsum without pulverization, for use in the arts, by first dehydrating it, substantially as described, and then treating it with a bath or baths containing a liquid salt and an acid, substantially as described, either with or without a coloring-matter, substantially as described.

3. In the production of articles of manufacture from gypsum without pulverization, the method of operation set forth, which consists in first driving off all or the greater part of the chemically-combined water by the application of heat in a suitable oven, and then soaking it to or nearly to the point of saturation in a moderately strong or unsaturated solution of alkaline salt at about atmospheric temperature, and either with or without the use in the same or a separate bath or baths of a soluble acid or coloring-matter, or both, substantially as set forth.

4. As a new product or material in the arts, gypsum artificially dehydrated, hardened, and polished, without pulverization, substantially in the manner set forth.

5. As a new product or material in the arts, gypsum artificially dehydrated, hardened, colored, and polished, without pulverization, substantially in the manner set forth.

6. As a step in the process of making imitation marble, stone, &c., from gypsum, subjecting the unground gypsum for about twelve hours to a temperature of about from 120° to 150° centigrade, substantially as set forth.

7. As a step in the process of making imitation marble, stone, &c., from gypsum, subjecting the unground gypsum after dehydrating for about twelve hours to the action of a moderately-strong but unsaturated solution of alkaline salt, either with or without other ingredients, substantially in the manner set forth.

8. In the preparation of gypsum for use in the arts, the method of treating the gypsum by repeated dippings in a suitable bath, the successive dippings being of gradually increasing length and separated by gradually increasing intervals of time, substantially as set forth.

In testimony whereof I have signed my name to this specification in the presence of two subscribing witnesses.

RAPHAEL JOSIA.

Witnesses:
BARTHOLOMY REY,
SPIRITO BRUNEN.